United States Patent [19]

De Sadeleer et al.

[11] Patent Number: 5,725,900
[45] Date of Patent: Mar. 10, 1998

[54] CO-PRESSING OF OILSEEDS

[75] Inventors: Jos Willy Ghislain Corneel De Sadeleer, Holsbeek, Belgium; Bernard Boulet; Richard Wos, both of Bierne, France

[73] Assignee: Cerestar Holding B.V., Sas van Gent, Netherlands

[21] Appl. No.: 645,961

[22] Filed: May 10, 1996

[30] Foreign Application Priority Data

May 15, 1995 [GB] United Kingdom ............... 9509811

[51] Int. Cl.$^6$ ................................................. A23D 9/02
[52] U.S. Cl. ........................ 426/601; 426/543; 426/589
[58] Field of Search ............................ 426/589, 601, 426/543

[56] References Cited

U.S. PATENT DOCUMENTS

| | | | |
|---|---|---|---|
| 2,282,797 | 5/1942 | Musher | 260/412.4 |
| 4,160,850 | 7/1979 | Hallstrom et al. | 426/601 |
| 4,744,926 | 5/1988 | Rice | 426/601 |
| 5,169,667 | 12/1992 | Pompen et al. | 426/589 |

FOREIGN PATENT DOCUMENTS

| | | |
|---|---|---|
| 2 684 388 | 6/1993 | France . |
| 41 25 559 | 7/1992 | Germany . |
| 2 268 185 | 1/1994 | United Kingdom . |

OTHER PUBLICATIONS

Database WPI Week 9515, Derwent publications Ltd., London, GB; an 95–110890 and JP-A-07 034 087 (Yoshihara Oil Mill), 3 Feb. 1995.

*Primary Examiner*—Thomas G. Wyse
*Attorney, Agent, or Firm*—Cushman Darby & Cushman IP Group of Pillsbury & Sutro, LLP

[57] ABSTRACT

The present invention discloses a method for obtaining oil mixtures comprising wheat germ oil characterized in that the oil is obtained by co-pressing of wheat germs with oil containing seeds or germs from at least one other species. The present invention further discloses oil mixtures containing wheat germ oil.

20 Claims, No Drawings

CO-PRESSING OF OILSEEDS

The present invention discloses mixtures of vegetable oils, and a method for obtaining such mixtures. Specifically, these mixtures contain wheat germ oil.

Wheat germ oil shows interesting characteristics due to the presence of polyunsaturated fatty acids such as linoleic acid and alpha-linolenic acid. Wheat germ oil in addition contains large amounts of the antioxidant vitamin E (more than 300 IU/100 g), as well as vitamin A. It therefor has very interesting nutritional properties, and can also be used as base for emulsions which contain natural vitamins such as vitamin A, E and others.

Traditionally oil is isolated from germs or seeds by pressing. The pressing is often followed by solvent extraction. This in turn necessitates the subsequent refining of the oil.

In order not to interfere with the delicate natural properties of the wheat germ oil it is preferable to isolate the oil by mechanical pressing, without the need for refining.

Hydraulic extraction of oil from oilseeds is a well known process. The parameters which influence the yield of the oil have been studied extensively. In general about 6 to 8% of the oil remains in the material after pressing.

Wheat germs are a by-product of the flour-milling industry. After milling the germs are in admixture with wheat bran. Wheat germs form only about 25% of this mixture. The oil forms only a part (about 30%) of the germ, thus the oil forms only about 7% of the wheat bran/wheat germ mixture. Hydraulic extraction of the oil from the germs is therefore not feasible.

Increase of the amount of oil in the wheat germ/wheat bran mixture requires addition of isolated wheat germs. Isolating of these germs would require the use of complex and expensive machinery. The use of wheat germ oil is therefore very limited and no industrial scale production of this oil is known to date.

Mixtures of vegetable oils are known. They are generally prepared by mixing isolated oils in desired ratios. Vegetable oils and mixtures thereof are used in edible compositions, cosmetic applications are also known.

U.S. Pat. No. 2,282,797 discloses the manufacture of cereal germ oil. The process of this invention is performed as follows. A finely milled oily paste is prepared by grinding or finely macerating a sufficient quantity of glyceride oil, preferably cod liver or other fish oil, with wheat germ, and then expressing in a plate press. To recover the wheat germ oil a prior isolated oil is used.

Japan Patent application JP 5-178919 (Published as JP-A-07-34087) discloses a method for obtaining aromatic oils wherein the aromatic oils are obtained by roasting of oil seeds by irradiation with microwaves, and wherein the mentioned roasted oil seeds are used for oil pressing.

The present invention discloses a method for obtaining oil mixtures containing wheat germ oil. The method comprises the mixing of wheat germs with other oil-containing seeds or germs before pressing.

The present invention discloses mixtures of wheat germ oil and oil obtained from other germs or seeds.

The present invention discloses a method for obtaining oil mixtures containing wheat germ oil. The method is based on the finding that wheat germ oil can be extracted by simple pressing, provided the germs are mixed with other oil containing germs or seeds.

The method which consists of mixing of oil-containing germs and/or seeds prior to pressing can be employed on an industrial scale as is done with the normally performed pressing of oil-containing seeds. The method does not require any additional investments in processing equipment.

In one embodiment of the present invention wheat germs are isolated from the by-product of the flour-milling industry. The germs are mixed with other oil-containing germs or seeds and the mixture is pressed. This process yield mixtures of oils.

In a preferred embodiment of the subject invention the wheat germ containing by-products of the flour-milling industry are mixed with desired germs or seeds without prior enrichment of the wheat germs. Pressing of this mixtures using standard processes yields mixtures of oils.

The germs or seeds which are added to the flour-milling products are added in such amounts that the total percentage of oil is increased from 6–8% to more than 15% preferably to more than 20%.

Prior to the present invention it was not predictable whether a process like this would be feasible. It was not known whether the wheat germ oil would be extracted at all or to what percentage. The examples serving to illustrate the present invention disclose that the percentage of wheat germ oil in the co-pressed product is equivalent with the percentage of wheat germ oil in the mixture before pressing. Thus the percentage of the different oils in the final product is to a certain extent regulated by the amount of oil seeds or germs added to the flour-milling product.

The added oilseeds or germs are selected from the group of seeds and germs which are edible or contain edible oil. Included among these seeds are corn, soybean, sesame, sunflower, safflower and rapeseed. The mixtures are made before co-pressing in such a way that they contain the desired ratios of germs.

The mixtures obtained are used as such or they are further purified according to methods known in the art.

Other desired oils are added to the mixtures if needed. Depending on the application it is further possible to add spices, herbs and other ingredients in the oil mixtures. The mixtures of the present invention can be used as a basis for dressings, sauces, etc. The mixtures are also used in cosmetic applications.

The mixing process is important, care should be taken that the germs are homogenously mixed. Due to the difference in germs format and density inhomogenous mixtures can be obtained this influences the yield and composition of the pressed oil. For the person skilled in the art it is further evident that optimal pressing conditions (temperature, pressing force) depend on the germ mixtures and the presses which are employed.

Wheat germs are mixed with other oil-containing seeds or germs before pressing. The ratio is in the range from 10:90 to 90:10. Care should be taken however that the total amount of oil is not too low ie. lower then about 8% as in that case oil is not normally pressed out of the germs. Pressing of the mixture of oil containing germs and seeds gives oil mixtures containing from 5 to 50% of wheat germ oil, preferably from 10 to 40%.

When corn is mixed with wheat germ the relative amount of wheat germ oil obtained increases with increasing amount of wheat germ. However the overall yield becomes lower (Example 1).

Mixing of wheat germ with sunflower, safflower, sesame and soya in a 50:50 ratio gives about 10% wheat oil in the pressed oil with a recovery of about 70% (overall) (Example 2). The percentage of wheat germ oil present after large scale pressing corresponds with that obtained after pressing on a bench scale.

Example 3 shows that wheat germ oil is present at a level of 14% when mixed with dehulled sunflower prior to pressing on a large scale. In Example 2 this was about 11%.

The present invention thus enables producing of wheat germ oil by pressing without having to employ solvent extraction.

The invention is illustrated in the following examples.

EXAMPLE 1

A mixture of corn and wheat germs was introduced into a KOMET (CA 59G) press at ambient temperature and without prior treatment.

The corn germs contain about 39% w/w oil. Mixtures containing different ratio's corn/wheat were used. Throughput of the press was 3 to 4 kg/h. The proportion of wheat germ oil in the final product was calculated after quantitative analysis of the pressed oil. The calculation was based on the linolenic acid content which fatty acid is specific for wheat.

Results are presented in Table 1.

TABLE 1

| Germ blend | | % Oil in germ mix | Oil recovery % of oil from germ mix | % Wheat oil in presed oil |
|---|---|---|---|---|
| % Corn | % Wheat | | | |
| 30 | 70 | 16,6 | 27,7 | 35,5 |
| 50 | 50 | 23,0 | 70,4 | 22,5 |
| 70 | 30 | 29,4 | 55,1 | 6,8 |
| 80 | 20 | 32,6 | 78,5 | 5,5 |

It can be concluded that the wheat oil level in the pressed oil increases with increasing percentage of wheat germ in the blend. About 5% of the oil in the mix is from wheat when the blend contains 20% wheat germ. However the total oil recovery is high.

EXAMPLE 2

Pressing is performed as in Example 1.

Different oil seeds were mixed with the wheat germs in a ratio of 1:1. The oilseeds were sunflower, sesame, soya and safflower.

As with corn in Example 1 the oil yield was from about 60% to about 75%. However the percentage of wheat oil in the oil mixture was only about 10% whereas it was 22.5% when corn was used. The results are presented in Table 2.

TABLE 2

| Germ blend | % Oil in germ mix | Oil recovery % of oil from germ mix | % Wheat oil in pressed oil |
|---|---|---|---|
| Sunflower | 24,50 | 67,7 | 10,8 |
| Safflower | 21,75 | 64,0 | 11,1 |
| Sesame | 30,25 | 71,5 | 9,0 |
| Soya | 13,90 | | 20,5 |

EXAMPLE 3

Pilot plant tests were performed on a KOMET DD85 press with a capacity of 25 kg/h. Dehulled sunflower and wheat germs (composition: table 3) were mixed in the indicated ratios (Table 4). Prior to the trial the wheat germs were stored over a long period (6 weeks) to assess the impact of storage on the vitamine E level. The vitamin E level remained in accordance to the level which is to be expected from the literature. Calculation of the wheat oil level in the extracted oil was done as for the lab trials via the level of linolenic acid which is specific for wheat oil. As was the case for the lab trials, the total oil yield increased when decreasing the fraction of wheat germ, but the wheat oil level in the extracted oil is lower. At a 1 to 1 ratio the wheat oil level in the extracted oil increased to 14%. These levels are higher than the theoretically calculated level. This means that the unexpected results of this invention can be due to at least two phenomonas: an improved pressing effect due to improved mechanical forces, and the use of the second oil to extract the wheat oil from its germ.

Dehulled sunflower and wheat germs were mixed in the indicated ratio (Table 3).

TABLE 3

| | wheat germ fraction | dehulled sunflower |
|---|---|---|
| % fat | 6.5 | 54 |
| % d.s. | 91 | 96.5 |
| C16 (%) | 17.68 | 6.90 |
| C16:1 | 0.18 | 0.12 |
| C18 | 0.66 | 4.61 |
| C18:1 | 12.79 | 25.16 |
| C18:2 | 58.11 | 61.45 |
| C18:3 | 7.92 | 0.08 |
| C20 | 0.15 | 0.30 |
| C20:1 | 1.23 | 0.14 |
| C22 | 0.15 | 0.71 |
| Vitamin E (UI) | 383 | 125 |
| Sterols (mg/100 g) | 4257 | 371 |

TABLE 4

| | Trial 1 | Trial 2 | Trial 3 |
|---|---|---|---|
| Ratio sunflower/wheat | 50/50 | 60/40 | 70/30 |
| % oil in germ mix | 30 | 35 | 40 |
| % oil in cake | 12 | 13 | 14.5 |
| % total oil extracted | 20.5 | 25 | 29.5 |
| % wheat oil in extracted oil | 14 | 11 | 8 |
| % C 18:3 in extracted oil | 1.11 | 0.85 | 0.6 |

These large scale trials confirmed the results found in the previous examples.

EXAMPLE 4

Plant tests were run on an ANDERSON press. Mixtures of wheat germ fractions and corn germs (weight ratio 1 to 1) were treated at a capacity of 2 t/h. The results are summarised in table 5.

TABLE 5

| | % oil | % linolenic acid | alpha tocopherol mg/100 g |
|---|---|---|---|
| wheat germ fraction | 7.5 | 9.9 | 240 |
| corn germs | 26.5 | 1.2 | 0.4 |
| germ mix | 20.5 | 2.5 | 53 |
| extracted oil | 100 | 2.4 | 51 |

Typically the wheat oil level in the oil mixture obtained was in agreement with the lab and pilot trials run.

We claim:

1. A method for obtaining oil mixtures comprising wheat germ oil wherein wheat germs in the form of a by-product from flour-milling are mixed with at least one other species of oil-containing germ or seed before pressing.

2. A method according to claim 1, wherein the other oil containing germ or seed is selected from the group of corn, sunflower, safflower, sesame, soybean and rapeseed.

3. A method according to claim 1, wherein the wheat germs and the other oil containing germ or seed are mixed in a ratio of 50:50 preferably in a ratio of 30:70.

4. A method for obtaining an oil mixture containing a wheat germ oil, comprising the steps of:

mixing a product containing wheat germ with a sufficient amount of at least one other oil-containing germ or seed to provide a raw material mix having a total percentage of oil greater than 8% w/w; and pressing said mix to extract said oil mixture.

5. The method of claim 4 wherein said product containing wheat germ is a flour-milling by-product.

6. The method of claim 4 wherein said product containing wheat germ has about a 7% total oil content.

7. The method of claim 4, wherein the total percentage of oil in said mix is greater than 15% w/w.

8. The method of claim 4, wherein the total percentage of oil in said mix is greater than 20% w/w.

9. The method of claim 4, wherein the percentage of wheat germ oil in said oil mixture is at least equivalent to the percentage of wheat germ oil contributing to said total percentage of oil in said raw material mix.

10. The method of claim 4, wherein the percentage of wheat germ oil in said oil mixture is greater than the percentage of wheat germ oil contributing to said total percentage of oil in said raw material mix.

11. The method of claim 9, wherein the percentage of wheat germ oil in said oil mixture is from 5 to 50%.

12. The method of claim 11, wherein said percentage is from 10 to 40%.

13. The method of claim 4, wherein said at least one other oil-containing germ or seed is edible or contains an edible oil.

14. The method of claim 4, wherein said raw material mix is substantially homogeneous.

15. An oil mixture containing wheat germ oil, comprising:

an oil hydraulically extracted from a raw material mix comprising a product containing wheat germ with a sufficient amount of at least one other oil-containing germ or seed to provide a raw material mix having a total percentage of oil greater than 8% w/w.

16. The mixture of claim 15 wherein said product containing wheat germ is a flour-milling by-product.

17. The mixture of claim 15 wherein said product containing wheat germ has about a 7% total oil content.

18. The mixture of claim 15, wherein the total percentage of oil in said raw material mix is greater than 15% w/w.

19. The mixture of claim 15, wherein the percentage of wheat germ oil in said oil mixture is at least equivalent to the percentage of wheat germ oil contributing to said total oil in said raw material mix.

20. The mixture of claim 15, wherein the percentage of wheat germ oil in said oil mixture is from 5 to 50%.

* * * * *